(12) United States Patent
Gahleitner et al.

(10) Patent No.: US 7,619,165 B2
(45) Date of Patent: Nov. 17, 2009

(54) CABLE WITH THERMOPLASTIC INSULATION

(75) Inventors: Markus Gahleitner, Neuhofen a.d. Kremis (AT); Karl-Michael Jager, Gothenburg (SE); Robert Nigel Hampton, Peachtree City, GA (US); Pirjo Jaaskelainen, Porvoo (FI); Magnus Palmlof, Vastra Frolunda (SE); Bo Malm, Espoo (FI); Merja Poikela, Nokia (FI); John Haugen, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/572,469

(22) PCT Filed: Jun. 20, 2005

(86) PCT No.: PCT/EP2005/006650

§ 371 (c)(1),
(2), (4) Date: Oct. 2, 2007

(87) PCT Pub. No.: WO2006/007918

PCT Pub. Date: Jan. 26, 2006

(65) Prior Publication Data

US 2008/0093104 A1    Apr. 24, 2008

(30) Foreign Application Priority Data

Jul. 20, 2004   (EP) .................... 04017147

(51) Int. Cl.
*H01B 3/00*      (2006.01)
(52) U.S. Cl. .................... 174/110 R
(58) Field of Classification Search .......... 174/110 R, 174/110 PM
See application file for complete search history.

(56) References Cited

U.S. PATENT DOCUMENTS

| | | | |
|---|---|---|---|
| 4,626,618 A * | 12/1986 | Takaoka et al. | 174/105 SC |
| 6,342,564 B1 | 1/2002 | Malm et al. | |
| 2002/0010241 A1 * | 1/2002 | Pitteri et al. | 524/240 |
| 2004/0210002 A1 * | 10/2004 | Haerkoenen et al. | 525/192 |

FOREIGN PATENT DOCUMENTS

| | | |
|---|---|---|
| EP | 0 893 801 A | 1/1999 |
| EP | 1 354 901 A | 10/2003 |
| WO | 01/37289 A | 5/2001 |

* cited by examiner

*Primary Examiner*—Chau N Nguyen
(74) *Attorney, Agent, or Firm*—Roberts Mlotkowski Safran & Cole, P.C.

(57) ABSTRACT

Insulation layer for cables comprising a heterophasic polymer composition having superior mechanical and electrical properties and being environmentally friendly. The heterophasic polymer composition comprises a polymer matrix and dispersed therein a propylene copolymer having a weight average particle size of less than 1 μm.

27 Claims, No Drawings

CABLE WITH THERMOPLASTIC INSULATION

The present invention relates to an insulation layer for cables, in particular insulation layers comprising a heterophasic polymer composition having superior mechanical and electrical properties and being environmental friendly. Moreover, the present invention is related to a process for producing the insulation layer as well as to a use of the insulation layer. Further, the invention is also related to a cable comprising the inventive insulation layer as well as to a process for the manufacture of the cable comprising the inventive insulation layer.

Nowadays, ethylene polymer products are used as insulation and semiconducting shields for low, medium and high voltage cables, respectively, due to easy processability and their beneficial electrical properties. In addition, in low voltage applications polyvinyl chloride (PVC) is also commonly used as insulation material, usually in combination with softeners to reach desirable softness of cables. A draw back with PVC is the restricted operation temperature of 70° C. by standardization. This has to be seen in relation to the fact that PVC has a restricted mechanical performance at elevated temperatures. In addition, softeners have to be added to PVC in order to maintain a high level of flexibility. Insufficient amounts of softeners reduce low temperature properties of PVC significantly. From an environmental point of view, these softeners are not always regarded as problem-free, making them desirable to eliminate.

Cables comprising polyethylene layers are commonly operated at 70° C. However, there is a need of higher operating temperatures, which then require cross-linking of the polyethylene, otherwise the polyethylene would soften or even melt. Hence, in the cable sector, the coating surrounding the conductor commonly consists of cross-linked polyethylene materials to give a satisfactory mechanical performance even under heating in continuous use and under conditions of current overload while at the same time maintaining a high level of flexibility.

On the other hand, a disadvantage of these products is that cross-linked products are hard to recycle. Moreover, in some cases the outer-protective sheet consists of polyvinyl chloride (PVC) which is difficult to separate by conventional methods from the cross-linked polyolefins containing inorganic fillers. When the cable has reached the end of its operational lifetime, the whole cable has to be disposed and, in case of combustion, highly toxic chlorinated products are generated.

In the case of peroxide curing of cables the cross-linking stage itself is a limiting factor in terms of line speed. Moreover, in processing such cables by extrusion, it is important that cross-linking does not occur until the mixture has left the extruder, since premature cross-linking or scorch makes it impossible to maintain a uniform production capacity, and furthermore the quality of the resulting product will be unsatisfactory. Cross-linking or pre-curing within the extruder causes gelation and adhesion of the polymer gel to surfaces of the equipment, with consequent risk of plugging.

For the above given reason, there is a need for new layer compositions which allow a higher operating temperature than polyethylene or PVC materials, preferably an operating temperature of at least 90° C. Moreover, the new insulation layer shall reduce the scorch phenomenon also allowing a high extrusion speed. Moreover, the mechanical properties shall be improved in particular the impact strength and tensile strength.

EP 0 893 801 A1 discloses propylene polymer components suitable as insulation sheet material. It particularly discloses a composition of a crystalline propylene homopolymer or copolymer mixed with a copolymer of ethylene with an α-olefin having a low density and a high structural uniformity, in particular having a highly homogeneous distribution of the α-olefin between the polymer molecules. However, EP 0 893 801 A1 does not disclose a possibility having an insulation layer suitable for high temperature operation conditions, simultaneously having very good mechanical properties.

Therefore, the object of the present invention is to provide an environmental friendly insulation layer allowing an operation temperature of at least 90° C. and simultaneously having enhanced mechanical properties in particular a high impact strength and a good tensile strength.

The present invention is based in the finding that this object can be solved by an insulation layer for cables comprising an heterophasic polymer composition comprising a propylene copolymer having a specific particle size.

Therefore, the present invention provides an insulation layer for cables comprising a composite, whereby the composite comprises a heterophasic polymer composition (A) comprising
a polypropylene matrix (1) and dispersed therein
a propylene copolymer (2) having a weight average particle size of less than 1 μm, more preferably less than 0,9 μtm and most preferably less than 0,8 μm.

Such an insulation layer is not only environmental friendly but also allows operation temperatures for cables of at least 90° C. This is due to relatively high elastic modulus exhibited by the composite at elevated temperatures of relevance compared to high density polyethylene (HDPE), PVC and cross-linked low density polyethylene. Moreover, this insulation layer has attractive mechanical properties in terms of e.g. a suitable balance between impact strength and flexural modulus.

Heterophasic polymer compositions according to this invention are compositions comprising a propylene matrix in which a copolymer is dispersed having a lower structural order than the matrix.

Important for the present invention is that the propylene copolymer (2) has a particle size of at least less than 1 μm. This particle size allows a good particle distribution in the matrix and influences the impact strength of the insulation layer positively. Moreover, a low average particle size decreases the risk of crazes being initiated by these particles while improving the possibility of said particles to stop already formed crazes or cracks. The particle size distribution of the propylene copolymer (2) in the polypropylene matrix (1) can be determined by suitable microscopic methods. Examples for such methods are atomic force microscopy (AFM), scanning electron microscopy (SEM) and transmission electron microscopy (TEM). Etching and/or staining of the specimens is normally required to achieve the necessary resolution and clarity of images. Examples for the determination of the particle size distribution and the calculation of the weight average particle size there from can be found in the literature. A suitable method involving SEM on specimens stained with $RuO_4$ is described in Polt et al. J. Appl. Polym. Sci. 78 (2000) 1152-61. This SEM has been used to determine the weight average particle size in the present invention.

It is preferred that the content of the composite as defined above and further defined in the following is in the insulation layer at least 90 wt-%, more preferred 95 wt-%.

Moreover, it is preferred that the composite is a thermoplastic polyolefin composition. Under "thermoplastic material" a material is understood which is capable of being repeatedly melted by increasing temperature and solidified by decreasing temperature. Thermoplastic materials are those materials the change of which upon heating is substantially physical rather than chemical. They are largely two- or one-dimensional molecule structures.

The molecular weight can be characterized by the way of its melt flow rate (MFR) according to ISO 1133 at 230° C. The melt flow rate is mainly depending on the average molecular weight. This is because of the fact that long molecules give the material a lower flow tendency than short molecules.

An increase in molecular weight means a decrease in the MFR-value. The melt flow rate (MFR) is measured in g/10 min of the polymer discharged through a defined die under specified temperature and pressure conditions and is a measure of the viscosity of the polymer which in turn for each type of polymer is mainly influenced by its molecular weight, but also by its degree of branching. The melt flow rate measured under a load of 2.16 kg (ISO 1133) is denoted as $MFR_2$.

In the present invention, it is preferred that the composite has an $MFR_2$ (measured according to ISO 1133) of 0.5 to 50 g/10 min, more preferred of 0.55 to 20 g/10 min, most preferred 0.5 to 8 g/10 min. Moreover, it is preferred that the composite is a thermoplastic polyolefin composition having an $MFR_2$ of 0.5 to 50 g/10 min, more preferably of 0.55 to 20 g/10 min, most preferably of 0.5 to 8 g/10 min.

It is further preferred that the density of composite has to be in a given range. The density has influence on the property of the insulation layer such as impact strength and shrinkage characteristics. Additionally, the optimum dispersion of possible additives in the composite is dependent on the right choice of the density. For this reason, a balance between these properties should be established. For the inventive insulation layer the composite has preferably a density range between 0.89-0.95 $g/cm^3$ and more preferably of 0.90-0.93 $g/cm^3$. The density has been measured according to ISO 11883.

In order to achieve a good balance of the properties in the insulation layer, the amount of propylene matrix (1) and the amount of the propylene copolymer (2) dispersed in the matrix (1) is of importance. The matrix gives the insulation layer the stiffness and tensile strength whereas the propylene copolymer (2) improves the impact strength. Hence, it is preferred that the composition (A) comprises 50-90 wt-% of the polypropylene matrix (1), more preferred 55-85 wt-% and most preferred 60-80 wt-%. On the other hand, as stated above, the amount and particle size of the propylene copolymer (2) has a positive influence on the impact strength. It is therefore preferred that the composition (A) comprises 10-50 wt-% of the propylene copolymer (2) dispersed in the propylene matrix (1), more preferred 15-45 wt-% and most preferred 20-40 wt-%.

Optionally the propylene copolymer (2) may also include crystalline polyethylene but not more than 10 wt %, more preferably 5 wt % and most preferably 2 wt % of the total propylene copolymer (2).

Heterophasic polymer compositions normally comprise a matrix (1) in which a further polymer component is dispersed. Thereby, the matrix (1) can be of a homopolymer or copolymer nature.

The term "homopolymer" used herein refers to isotactic polypropylene that substantially, i.e. to at least 98 wt %, consists of propylene units. Preferably this homopolymer consists of 99 wt %, more preferably of 99,5 wt % of propylene units However, in the present invention it is preferred that the matrix (1) is a propylene copolymer and more preferably a random propylene copolymer. A random copolymer is a copolymer consisting of alternating sequences of two monomeric units of random length (including single molecules).

Hence, according to this definition it is preferred that the random propylene copolymer comprises at least one comonomer selected from the group consisting of ethylene and $C_4$-$C_8$ α-olefin. Preferred $C_4$-$C_8$ α-olefins are 1-butene, 1-pentene, 4-methyl-1-pentene, 1-hexene, 1-heptene or 1-octene, more preferred 1-butene. The most preferred random propylene copolymer consists of propylene and ethylene.

Preferably the comonomer content of the polypropylene matrix (1) is 0.5-10 wt-%, more preferably 1-8 wt-% and most preferred 2-6 wt-%.

The incorporation of the comonomer reduces both the melting point and the crystallinity of the polypropylene matrix, the latter becoming effective in a reduction of the melting enthalpy as determined in DSC (ISO 3146). In case of ethylene as a comonomer, the melting points of such polymers are preferably in the range of 120 to 162° C., more preferably 130 to 160° C., while the melting enthalpies are in the range of preferably 40 to 95 J/g, more preferably 60 to 90 J/g.

For combining optimum processability with the required mechanical properties the incorporation of the comonomer can be controlled in such a way that one part of the polypropylene contains more comonomer than the other. To ensure suitability for the purpose of this patent these intrapolymeric differences in comonomer content must not exceed a level which still allows full miscibility of all parts of the polymer. Suitable polypropylenes are described e.g. in WO 03/002652 (Propylene Random Copolymer and Process for the Production thereof) and are herewith incorporated by reference.

It is in particular preferred that the propylene copolymer (2) as defined above is substantially amorphous. Amorphous copolymers, in technical terms normally called "rubbers", are especially suitable for improving the impact strength and flexibility of the insulation layer when incorporated into the polypropylene matrix (1). A polymer is amorphous when it has no definite order or crystalline structure, expressed in a lack of melting point and enthalpy when investigated by DSC. The term "substantially amorphous" means that the propylene copolymer can have residual crystallinity below a level corresponding to a melting enthalpy of 10 J/g.

Preferably the propylene copolymer (2) dispersed in the polypropylene matrix (1) comprises at least one comonomer selected from the group consisting of ethylene and $C_4$-$C_8$ α-olefin. Preferred $C_4$-$C_8$ α-olefins are 1-butene, 1-pentene, 4-methyl-1-pentene, 1-hexene, 1-heptene or 1-octene, more preferred is 1-butene. The most preferred substantially amorphous propylene copolymer (2) is a so-called "ethylene-propylene rubber" (EPR), comprising 30-70 wt % ethylene units and 70-30 wt % propylene units. Optionally this copolymer can also contain diene units and is then technically denoted as "ethylene-propylene diene rubber" (EPDM). While the EPR can be both produced either directly in one step of the polymerization of the polypropylene or added as a separate component in a subsequent melt mixing or blending step, the EPDM can only be added in a subsequent melt mixing or blending step.

Preferably the comonomer content of the propylene comonomer (2) is 20-80 wt-%, more preferably 30-70 wt-% and most preferred 60-65 wt-%.

Beside the heterophasic polymer composition (A) the composite can comprise preferably in addition a polyethylene (B). With such a polyethylene (B), the mechanical properties can be further adapted to the environmental circumstances, i.e. if a further improvement of impact strength, softness or resistance to stress whitening (blush) is required, this can be achieved by incorporating a suitable polyethylene (B). The modulus of the polyethylene added should be lower than the modulus of the polypropylene matrix (1) to ensure a positive influence. It is preferred that a polyethylene of density of 930 kg/m³ or less is used, including both low density polyethylenes (PE-LD) being produced in a high pressure process and linear low density polyethylenes (PE-LLD) being produced in a low pressure process. For cable insulation compositions the low ash content of PE-LD resulting from the absence of catalyst in the polymerisation process can be an additional advantage.

Moreover, by adding the polyethylene (B) as defined above to the composite comprising the heterophasic polymer composition (A) the impact strength is improved as can be seen by the higher values measured by the Charpy impact test. This test is a destructive test of impact resistance consisting of placing the optionally notched specimen in a horizontal position between two supports and applying a strike of known intensity, which will normally fracture the specimen. The energy uptake (damping) in this fracturing process is recorded as a measure of impact strength.

Preferred polyethylenes used for modifying the insulation composition have a density of 910 to 930 kg/m³. In a low density polyethylene (PE-LD), the reduced crystallinity and density results from a random branching structure of the polymer molecules, while in a linear low density polyethylene (PE-LLD) higher α-olefins like 1-butene, 1-hexene or 1-octene as comonomers are used to achieve an analogous effect. The resulting material is relatively soft, flexible and tough and will withstand moderate heat.

Preferably the polyethylene (B) is present in an amount of 0 to 50 wt-%, more preferably 20 to 45 wt-% and most preferably between 30 to 40 wt-%. In addition, it is preferred that when polyethylene (B) is incorporated into the composite at least 20% of composition (A) is present in the composite.

More preferred, composition (A) ranges from 80 to 55 wt-% and most preferred 70 to 60 wt-%.

Preferably the fraction of the polypropylene matrix (1) present in the insulation composition has a melting enthalpy of 25 to 70 J/g at a melting temperature of 130 to 170° C. Moreover, it is preferred that the residual crystalline fraction of the propylene copolymer (2) and/or the polyethylene (B) has a melting enthalpy of 0.5 to 75 J/g at a melting temperature of 100 to 130° C. The melting of the insulation composition must take place at temperatures above 100° C. to ensure sufficient resistance to ambient temperatures and resistive heating.

The flexural modulus is the ratio, within the elastic limit, of the applied stress on a test specimen in flexure, to the corresponding strain in the outermost fibers of the specimen. For insulation layers for cables it is appreciated if the flexural modulus measured according to ISO 178 does not exceed 1000 MPa, more preferably 700 MPa, still more preferably ranges from 250-650 MPa, yet more preferably from 300-600 MPa and most preferably from 340-530 MPa. Furthermore, it is preferred that the above described insulation polymer has a tensile modulus ranging from 300-600 MPa, more preferred 350-550 MPa. The tensile modulus has been determined according to ISO 178.

Moreover, it is preferred that the elongation at break according to ISO 527 be at least 200%, more preferably ranges from 250-550%, still more preferably from 350-530% and most preferably from 370-490%. It is most preferred that the properties expressed by flexural modulus and tensile modulus as well as by the elongation at break are fulfilled simultaneously.

The Charpy impact strength is a destructive test of impact resistance consisting of placing the optionally notched specimen in a horizontal position between two supports and applying a strike of known intensity, which will normally fracture the specimen. The energy uptake (damping) in this fracturing process is recorded as a measure of impact strength. The Charpy impact has been measured according to ISO 179 1 eA (23° C.) and according to ISO 179 1 eA (−20° C.). It is preferred that the values measured at 23° C. for the Charpy impact test ranges from 50-100 kJ/m², more preferably from 55-96 kJ/m² and most preferred from 80-95 kJ/m². In addition, preferably the values measured at −20° C. according to ISO 179 1eA ranges from 2-15 kJ/m², more preferably from 8-14 kJ/m². In addition, it is preferred that the impact strength properties measured according to ISO 179 are simultaneously fulfilled with the properties expressed by the flexural modulus, tensile modulus and elongation at break.

Moreover, the present invention also comprises a process for producing the inventive insulation whereby the polypropylene matrix (1) is produced in one or more slurry reactors and optionally one or more gas phase reactors followed by producing a propylene copolymer (2) in the gas phase and optionally adding polyethylene (B) by blending or in-situ polymerization of ethylene in the reactor system. Subsequently, to the additives can further on be added heterophasic polymer composition (A) by any kind of blending or mixing operation.

The slurry phase polymerization can be carried out at temperatures of lower than 75° C., preferably 60-65° C. and pressure varying between 60-90 bar, preferably 30-70 bar. The polymerization is preferably carried out under such conditions that 20-90 wt-%, preferably 40-80 wt-% from the polymers are polymerized in the slurry reactors. The residence time can be between 15-20 minutes.

The gas phase polymerization step is carried out preferably by transferring the reaction mixture from the slurry phase directly to the gas phase without removing unreacted monomers, more preferably by a pressure of higher than 10 bar. The reaction temperature used will generally be within the range of 60-115° C., more preferably 70-110° C. The reaction pressure will be preferably higher than 5 bar and more preferably be in the range of 10-25 bar, and the residents time will preferably be 0.1-5 hours.

Preferably a loop reactor is used as said slurry reactor although the reactor types such as a tank reactor could also be employed. According to another embodiment, the slurry phase is carried out in two slurry reactors preferably but not necessarily in two loop reactors. By doing so the comonomer distribution can easily be controlled. When continuing the copolymerization in the gas phase reactor or reactors, the comonomer content can be increased further. Thus, the matrix polymer can be tailored by adjusting comonomer ratios in different reactors.

Polymerization may be achieved by using any standard olefin polymerization catalyst and these are well known to the person skilled in the art. Preferred catalyst systems comprise an ordinary stereo-specific Ziegler-Natta-catalyst, metallocene catalyst and other organo-metallic or coordination catalysts. A particularly preferred catalyst system is a high yield Ziegler-Natta-catalyst having a catalyst component, a co-catalyst component, optionally an external donor. The catalyst system may thus contain a titanium component and an electron/donor compound supported on an activated magnesium dichloride, a trialkylaluminum compound as an activator and an electron/donor compound. A further preferred catalyst system is a metallocene catalyst having a bridged structure giving a high stereo activity and which is an active complex impregnated on a carrier. Suitable catalyst systems are described in for example FI 88047, EP 491566, EP 586390 and WO 98/12234 which are hereby incorporated by reference. Moreover, the present invention comprises the use of the inventive insulation layer as described above for cables, more preferably for medium or high voltage cables.

The present invention is also related to a new cable consisting of at least one conductor and at least one insulation layer as defined above. For low voltage applications the cable system shall preferably either consist of one conductor and one insulation layer, or of one conductor, one insulation layer and an additional jacketing layer, or of one conductor, one semiconductive layer and one insulation layer. For medium and high voltage applications it shall preferably consist of one conductor, one inner semiconductive layer, one insulation layer and one outer semiconductive layer, optionally covered by an additionally jacketing layer. The semiconductive layers mentioned consist preferably of a thermoplastic polyolefin composition containing a sufficient amount of electrically conducting solid fillers preferably carbon black. At least one of the layers is the inventive layer mentioned above. It is preferred that the insulation layer, more preferably the inventive insulation layer, contains solid fillers, more preferably carbon black.

Not only solid fillers can be incorporated into the insulation layer, but also any other additives suitable for insulation layers for cables.

Moreover, not only the insulation layer but also other layers can comprise the composite as defined above. Hence, also the semiconductive layer and/or the jacketing layer may comprise the inventive composite. It is preferred that the composite in the layers is thermoplastic, more preferred that the layers are thermoplastic.

The final cable can also consist of multiple conductors or cores (normally 1,2,3 or 4) combined with single and common insulation layers.

The cables comprising the inventive layer shall have a very low shrinkage, preferably lower than 1.25% measured according to AEIC CS5-94, more preferably lower than 1.15%, still more preferably lower than 1.05% and most preferably lower than 1.02%. Moreover, the sagging measured according to IEC 60840 (1999) should be preferably lower than 15%, more preferably lower than 8%, still more preferably lower than 6,5%, and most preferably lower than 5,5%. In addition, it is preferred that both properties of the cables, i.e. shrinkage and sagging, fall within the given ranges as defined above simultaneously.

The present invention also comprises a process for producing cables as described above by extrusion of an insulation layer or layers onto the conductor or conductors followed by solidification of the thermoplastic polymer components at line speeds of up to 300 to 400 m/min.

More preferably the solidification takes place in a water bath.

EXAMPLES AND USED METHODS

DMTA—ISO 6721-2A, measured on compression molded plaque specimens of 1 mm thickness in torsional mode at 1 Hz and a heating rate of 2 K/min DSC—ISO 3146, measured on cut specimens of 0.5 mg in a heat-cool-heat cycle with heating/cooling rate of 10 k/min; the values for melting point Tm and melting enthalpy Hm are determined in the second heat Density—ISO 1183, measured on compression moulded plaques MFR—ISO 1133, measured at 230° C. for PP and at 190° C. for PE Flexural modulus—ISO 178, measured on injection moulded specimens of 80×10×4 mm, moulded in accordance to ISO 1873-2 standard conditions not earlier than 96 hours after moulding Elongation at break—ISO 527, measured on injection moulded dog-bone specimens of 3 mm thickness moulded in accordance to ISO 1873-2 standard conditions not earlier than 96 hours after moulding Charpy notched impact strength—ISO 179 1eA, measured on injection moulded specimens of 80×10×4 mm, moulded in accordance to ISO 1873-2 standard conditions not earlier than 96 hours after moulding Sagging: Sagging refers to a non-centricity of the insulation around the conductor. It can be evaluated be measuring the thickness of the insulation at different positions. The test specimens are typically microtomed slices. Values between 3 and 5% are common for PEX insulation. Cable standards may require not more than 15%. Measurements are made according to IEC 60840 (1999).

Shrinkage: Cable specifications require a maximum shrinkage of 4% after 6 hours annealing at 130° C. Shrinkage is measured as distance difference between two marks drawn onto the outer semicon layer before and after annealing of the complete cable core (conductor+insulation+inner & outer semicon layer). Tested according to AEIC CS5-94.

Break down: Reference: H. G. land, H. Schädlich, "Model cable test for evaluating the ageing behavior under water influence of compounds for medium voltage cables", JoCable-91, 24-28 Jun., 1991, Versailles, France, p. 177-182. Values are generated without prior wet ageing.

TMA (Thermal mechanical Analysis). A small cylindrical sample of ca 5 mm in diameter is placed under a V-shaped quartz bending probe at constant load while increasing the temperature of the sample by 10° C./minute up to 180° C.

TABLE I

| | | Component | | | | | | | |
|---|---|---|---|---|---|---|---|---|---|
| | | 1 | 2 | 3 | 4 | 5 | 6 | 7 | 8 |
| | | Type | | | | | | | |
| | | PP-I | PP-I | PP-R | PP-H | PE-LD | PE-LLD | PE-VTM | PE-HD |
| Density | kg/mB | 900 | 900 | 900 | 900 | 920 | 870 | 923 | 944 |
| MFR | g/10 min | 0.8 | 7 | 1.5 | 1.5 | 0.25 | 20 | 0.9 | 1.7 |
| Flexural Modulus | MPa | 480 | 400 | 850 | 1360 | 210 | 20 | 220 | 850 |
| Elongation at break | % | 490 | 320 | 200 | 150 | 600 | 800 | 550 | 700 |
| Charpy +23° C. | kJ/m2 | 92 | 65 | 20.9 | 18.7 | 23 | n.b. | n.b. | |
| Charpy −20° C. | kJ/m2 | 8.4 | 6.5 | 1.05 | 0.85 | 45 | 55 | 51.3 | |

TABLE I-continued

| | | Component | | | | | | | |
|---|---|---|---|---|---|---|---|---|---|
| | | 1 | 2 | 3 | 4 | 5 | 6 | 7 | 8 |
| | | | | | | Type | | | |
| | | PP-I | PP-I | PP-R | PP-H | PE-LD | PE-LLD | PE-VTM | PE-HD |
| Tm(DSC) | °C. | 143 | 142 | 133 | 163 | 110 | 68 | 108 | 128 |
| Hm(DSC) | J/g | 65.3 | 60.8 | 76.6 | 99.8 | 96.5 | 72.5 | 122.3 | 125.5 | n.b.—not broken
1, 2: Heterophasic propylene copolymer
3: Random propylene copolymer
4: Propylene homopolymer
5: Low density polyethylene
6: Linear low density polyethylene
7: Ethylene vinyl trimethoxy silane copolymer
8: High density polyethylene

TABLE II

| | Base polymer | Modifier type | Modifier amount wt-% | MFR 230° C./2.16 kg g/10 min | DSC Tm, 1 °C. | Hm, 1 J/g | Tm, 2 °C. | Hm, 2 J/g | Tc, 1 °C. | Tc, 2 °C. | cP (avg.) SEM μm |
|---|---|---|---|---|---|---|---|---|---|---|---|
| Ex. 1 | 1 | — | 0 | 0.8 | 111.3 | 0.77 | 142.8 | 65.3 | 101.5 | — | 0.65 |
| Ex. 2 | 1 | 5 | 30 | 0.55 | 108.6 | 49.7 | 142.8 | 28.8 | 100.4 | 95.8 | 0.82 |
| Ex. 3 | 3 | 5 | 40 | 1.28 | 109.6 | 64.1 | 142.9 | 36.5 | 112.1 | 97.2 | 0.91 |
| Ex. 4 | 2 | 5 | 30 | 3.42 | 108.9 | 52 | 142.8 | 32.7 | 102.1 | 96.3 | 0.95 |
| Com. Ex. 1 | 3 | 6 | 40 | 10.6 | 68.7 | 142.6 | 142.6 | 40.9 | 110.9 | 52.3 | 1.25 |
| Com. Ex. 2 | 3 | | 0 | 1.2 | 132 | 56.7 | 144.5 | 20.5 | 113.6 | — | — |
| Com. Ex. 3 | 4 | | 0 | 1.5 | — | — | 162.5 | 99.8 | 114.5 | 98.2 | — |
| Com. Ex. 4 | 7 | | 0 | 0 | 109.2 | 122.3 | — | — | 93.7 | — | — |

| | Flex | Tensile test | | Charpy ISO 179 1eA | | G (DMTA) | | TMA |
|---|---|---|---|---|---|---|---|---|
| | modulus MPa | modulus MPa | ExIB % | +23° C. kJ/m2 | −20° C. kJ/m2 | +23° C. Mpa | +90° C. Mpa | 110° C. % |
| Ex. 1 | 476 | 508 | 484 | 91.6 | 8.35 | 253 | 52 | 2 |
| Ex. 2 | 345 | 374 | 487 | 95.2 | 13.5 | 285 | 37 | 3.8 |
| Ex. 3 | 526 | 546 | 372 | 58.6 | 2.26 | 174 | 33 | 3.9 |
| Ex. 4 | 331 | 360 | 529 | 80.9 | 9.65 | 193 | 37 | 7.3 |
| Com. Ex. 1 | 190 | 243 | 196 | 56.4 | 70.1 | 153 | 18 | 9.3 |
| Com. Ex. 2 | 846 | 897 | 429 | 20.9 | 1.05 | 438 | 69 | 0.4 |
| Com. Ex. 3 | 1360 | 1400 | 150 | 18.7 | — | 783 | 92 | 0.3 |
| Com. Ex. 4 | 220 | 250 | 545 | — | 51.3 | 120 | 8.6 | 41.6 |

TABLE III

| | Example 6 | Example 7 | Example 8 | Com. Ex. 5 | Com. Ex. 6 |
|---|---|---|---|---|---|
| Cable # | 1 | 2 | 3 | 4 | 5 |
| Semicon inside | Ex. 4 + CB | Ex. 4 + CB | Ex. 4 + CB | Ex. 4 + CB | A + CB |
| Insulation | Ex. 2 | Ex. 3 | Ex. 4 | C. EX. 3 | Ex. 4 |
| Semicon outside | Ex. 4 + CB | Ex. 4 + CB | Ex. 4 + CB | Ex. 4 + CB | A |
| Melt temp. [° C.] | 195 | 195 | 195 | 205 | — |
| Melt press. [bar] | 60 | 42 | 29 | 35 | — |
| Line speed [m/min] | 1.7 | 1.7 | 1.7 | 1.6 | 1.2 |
| Shrinkage [%] | 1.01 | 1.01 | 1.01 | 0.8 | — |
| Sagging [%] | 5 | 5.2 | 4.1 | 10.7 | 5.0 |
| Breakdown str. [kV] | 73.5 | — | — | 38.9 | — |
| # breaks [—/—] | 4/6 | — | — | 5/5 | — |

CB = 30 wt % carbon black
A: ethylene-ethylacrylate copolymer having a MFR (2 kg/190° C.) of 7 g/10 min and a density of ca 930 kg/m3

The invention claimed is:

1. Insulation layer for cables comprising a composite, whereby the composite comprises a heterophasic polymer composition (A) comprising
a polypropylene matrix (1) and dispersed therein
a propylene copolymer (2) having a weight average particle size of less than 1 µm;
wherein the insulation layer has a flexural modulus that does not exceed 1000 MPa.

2. Insulation layer according to claim 1 characterized in that the composite content in the insulation layer is at least 90 wt %.

3. Insulation layer according to claim 1 characterized in that the composite has a $MFR_2$, measured according to ISO 1133, of 0.5 to 50 g/10min.

4. Insulation layer according to claim 1 characterized in that the composite has a density of 0.89 to 0.95 $g/cm^3$.

5. Insulation layer according claim 1 characterized in that the composition (A) comprises 50 to 90 wt % of the polypropylene matrix (1).

6. Insulation layer according to claim 5 characterized in that the polypropylene matrix (1) is a random propylene copolymer.

7. Insulation layer according to claim 6 characterized in that the random propylene copolymer comprises at least one comonomer selected from the group consisting of ethylene and $C_4$ to $C_8$ alpha-olefin.

8. Insulation layer according to claim 7 characterized in that the comonomer content in the polypropylene matrix (1) is 0.5 to 10 wt %.

9. Insulation layer according to claim 1 characterized in that the composition (A) comprises 10 to 50 wt % of propylene copolymer (2) dispersed in the polypropylene matrix (1).

10. Insulation layer according to claim 9 characterized in that the propylene copolymer (2) is substantially amorphous.

11. Insulation layer according to claim 9 characterized in that the propylene copolymer (2) comprises at least one comonomer selected from the group consisting of ethylene and $C_4$ to $C_8$ alpha-olefins.

12. Insulation layer according to claim 11 characterized in that the comonomer content in the propylene copolymer (2) is 30 to 70 wt %.

13. Insulation layer according to claim 1 characterized in that the composite comprises in addition a polyethylene (B).

14. Insulation layer according to claim 13 characterized in that the polyethylene (B) is a low density polyethylene produced in a high pressure process or a linear low density polyethylene produced in a low pressure process.

15. Insulation layer according to claim 13 characterized in that the propylene copolymer component (2) and/or the polyethylene (B) has a melting enthalpy of 0.5 to 75 J/g at a temperature range of 100 to 130° C.

16. Insulation layer according to claim 1 characterized in that the matrix (I) has a melting enthalpy of 25 to 70 J/g at a temperature range of 135 to 170° C.

17. Insulation layer according to claim 1 characterized in that the composite is a thermoplastic polyolefin composition.

18. Process for producing an insulation layer according to claim 1 characterized in that a polypropylene matrix (1) is produced in one or more slurry reactors and optionally one or more gas phase reactors followed by producing a propylene copolymer (2) in the gas phase and, optionally, adding polyethylene (B) by blending or in situ polymerization of ethylene in the reactor system.

19. Use of the insulation layer according to claim 1 for cables.

20. Use according to claim 19 for low, medium or high voltage cables.

21. Cable comprising at least one conductor and at least one insulation layer according to claim 1.

22. Cable according to claim 21 characterized in that the cable comprises a semicon and/or jacketing layer.

23. Cable according to claim 22 characterized in that the semicon and/or jacketing layer comprises a composite as in claim 1.

24. Cable according to claim 22 characterized in that all layers are thermoplastic.

25. Cable according to claim 21 characterized in that the insulation layer contains carbon black.

26. Process for producing a cable according to claim 1 by extrusion of an insulation layer or layers onto the conductor or conductors followed by solidification of the thermoplastic polymer components at line speeds of up to 300 to 400 m/min.

27. Process according to claim 26, whereby the solidification takes place in a water bath.

* * * * *